(12) United States Patent
Bernard et al.

(10) Patent No.: US 7,886,852 B2
(45) Date of Patent: Feb. 15, 2011

(54) HYBRID VEHICLE

(75) Inventors: Pierre Bernard, Laval (CA); Guy Gaudreau, Forestville (CA); Marc-Andre Lucier, St-Cyrille-de-Wendover (CA)

(73) Assignee: RPM Tech Inc., Laval, Quebec (CA)

( * ) Notice: Subject to any disclaimer, the term of this patent is extended or adjusted under 35 U.S.C. 154(b) by 211 days.

(21) Appl. No.: 12/438,195

(22) PCT Filed: Aug. 28, 2007

(86) PCT No.: PCT/CA2007/001509

§ 371 (c)(1),
(2), (4) Date: Feb. 20, 2009

(87) PCT Pub. No.: WO2008/025142

PCT Pub. Date: Mar. 6, 2008

(65) Prior Publication Data

US 2010/0012398 A1 Jan. 21, 2010

Related U.S. Application Data

(60) Provisional application No. 60/840,702, filed on Aug. 29, 2006.

(51) Int. Cl.
*B60W 10/04* (2006.01)
(52) U.S. Cl. .................................... 180/9.26
(58) Field of Classification Search ................ 180/9.26, 180/9.28, 9.3
See application file for complete search history.

(56) References Cited

U.S. PATENT DOCUMENTS

| | | | |
|---|---|---|---|
| 3,207,562 A | 9/1965 | Ewing | |
| 6,135,220 A | 10/2000 | Gleasman et al. | |
| 6,640,915 B2 * | 11/2003 | Haringer | 180/9.26 |
| 6,981,563 B2 | 1/2006 | Phely et al. | |
| 7,156,185 B2 * | 1/2007 | Juncker | 172/292 |
| D571,378 S | 6/2008 | Bernard et al. | |
| 2010/0139994 A1 * | 6/2010 | Hansen | 180/9.26 |

FOREIGN PATENT DOCUMENTS

| | | |
|---|---|---|
| CA | 2 440 934 A1 | 3/2005 |
| GB | 551288 | 2/1943 |

* cited by examiner

*Primary Examiner*—Kevin Hurley
(74) *Attorney, Agent, or Firm*—Fraser Clemens Martin & Miller LLC; J. Douglas Miller

(57) ABSTRACT

The hybrid vehicle kit comprises a vehicle body capable of being interchangeably coupled to either one of a wheel kit thus forming a hybrid vehicle in a wheel mode, the wheel kit having a number of ground-engaging wheels; and a track kit, thus forming the hybrid vehicle in a track mode, the track kit having a pair of ground-engaging tracks carried by track wheels. The vehicle has a pair of powered driving hydraulic pumps and a number of wheel drives powered by a corresponding one of the driving hydraulic pumps. In the wheel mode the ground-engaging wheels are operatively mounted to corresponding wheel drives and an electronic circuit calculates hydraulic rate data on the basis of speed data to control the first and second driving hydraulic pumps so that they will administer a hydraulic rate to the wheel drives which is representative of the hydraulic rate data to control the rotational speed of the ground-engaging wheels which will propel the hybrid vehicle. In the track mode at least some of the track wheels are operatively mounted to corresponding wheel drives and the electronic circuit calculates hydraulic rate data on the basis of the speed data and of the steering data to control the first and second driving hydraulic pumps so that they will administer a respective hydraulic rate to the wheel drives which is representative of the hydraulic rate data to control the rotational speed of the at least some of the track wheels that are operatively mounted to corresponding wheel drives, to both propel and steer the hybrid vehicle.

15 Claims, 11 Drawing Sheets

HYBRID VEHICLE

CROSS-REFERENCE DATA

This application claims the conventional priority of U.S. provisional patent application No. 60/840,702 filed on Aug. 29, 2006.

FIELD OF THE INVENTION

The present invention relates to hybrid land vehicles, and more particularly to a hybrid land vehicle capable of being equipped with either one of a wheel kit including ground-engaging wheels and a track kit including track wheels that carry and guide a pair of ground-engaging tracks.

BACKGROUND OF THE INVENTION

Known hybrid vehicles include vehicles having a vehicle body that can be equipped with either one of a set of ground-engaging wheels or endless tracks that are carried by guide wheels and driving wheels. Some such hybrid vehicles will be equipped with ground-engaging wheels that become both the guide wheels and the driving wheels for the tracks that will be installed thereover. Others will have distinct ground-engaging wheels and track guide and driving wheels. In all cases however, the known hybrid vehicles have drawbacks related to their efficiency, in that they suffer from their hybrid state and are often efficient neither in their wheel mode nor in their track mode.

SUMMARY

The present invention relates to a hybrid vehicle kit comprising
- a vehicle body comprising a chassis, a first actuator assembly carried by said chassis and a motor carried by said chassis;
- a wheel kit comprising a second actuator assembly and a number of ground-engaging wheels; and
- a track kit comprising track guide wheels, track driving wheels and a pair of ground-engaging tracks;
- wherein said vehicle body can be interchangeably coupled to either one of:
- a) said wheel kit, thus defining a wheel mode hybrid vehicle whereby said second actuator assembly is removably carried by said chassis, said ground-engaging wheels are operatively and removably coupled to said first and second actuator assemblies and said motor powers said first and second actuator assemblies; and
- b) said track kit, thus defining a track mode hybrid vehicle whereby said track guide wheels are removably carried by said chassis, said track driving wheels are operatively and removably coupled to said first actuator assembly, said tracks are operatively installed on respective said track guide and driving wheels and said motor powers said first actuator assembly.

In one embodiment, said first actuator assembly is pivotally installed on said chassis to allow said first actuator assembly to be pivoted between a first position corresponding to said wheel mode hybrid vehicle wherein said first actuator assembly is equipped with said ground-engaging wheels that have a rotational axis located at a first position relative to said chassis, and a second position corresponding to said track mode hybrid vehicle wherein said first actuator assembly is equipped with said track driving wheels that have a rotational axis located at a second position relative to said chassis which is higher than said first position.

In one embodiment, said track kit further comprises a track wheel framework removably installed on said chassis and carrying said track guide wheels.

In one embodiment, said body defines front and rear portions and said first actuator assembly is carried by said chassis front portion while said second actuator, in said is wheel mode hybrid vehicle, is carried by said chassis rear portion.

The present invention further relates to a method of converting a hybrid vehicle from a track mode to a wheel mode, said hybrid vehicle comprising in said track mode a vehicle body comprising a chassis, a first actuator assembly carried by said chassis, a motor carried by said chassis and powering said first actuator assembly, track guide wheels carried by said chassis, track driving wheels operatively coupled to said first actuator assembly, and a pair of ground-engaging tracks operatively installed on respective said track guide and track driving wheels, said method comprising the steps of:
- removing said ground-engaging tracks from said track guide and track driving wheels;
- removing said track guide wheels from said chassis;
- removing said track driving wheels from said first actuator assembly;
- removably installing a second actuator assembly on said chassis and operatively linking said second actuator assembly to said motor for powering said second actuator assembly with said motor; and
- removably operatively mounting ground-engaging wheels on said first and second actuator assemblies.

In one embodiment, the method further comprises the step of pivoting said first actuator assembly from a raised to a lowered position.

In one embodiment, the step of removing said track guide wheels from said chassis includes removing a track wheel framework from said chassis.

The present invention also relates to a method of converting a hybrid vehicle from a wheel mode to a track mode, said hybrid vehicle comprising in said wheel mode a vehicle body comprising a chassis, first and second actuator assemblies carried by said chassis, a motor carried by said chassis and powering said first and second actuator assemblies and a number of ground-engaging wheels carried by said chassis and operatively coupled to said first and second actuator assemblies, said method comprising the steps of:
- removing said second actuator assembly from said chassis whereby said ground-engaging wheels that are coupled to said second actuator assembly are concurrently removed from said hybrid vehicle;
- removing said ground-engaging wheels from said first actuator assembly;
- removably installing track guide wheels on said chassis;
- removably and operatively coupling track driving wheels to said first actuator assembly; and
- operatively installing ground-engaging tracks on respective said track guide and driving wheels.

In one embodiment, the method further comprises the step of pivoting said first actuator assembly from a lowered to a raised position.

In one embodiment, the step of installing said track guide wheels on said chassis includes installing a track wheel framework said chassis, with said track guide wheels being installed on said track wheel framework.

The present invention also related to a method of electronically controlling the hydraulic liquid feed rate of first and second driving hydraulic pumps that feed respective wheel drives of a hybrid vehicle, said hybrid vehicle of the type comprising a vehicle body carrying said first and second driving hydraulic pumps and a motor carried by said vehicle body that powers said first and second driving hydraulic pumps, said hybrid vehicle defining a track mode in which said hybrid vehicle body is equipped with a track kit comprising a pair of ground-engaging tracks on opposite sides of said vehicle body that are independently driven by respective said wheel drives when said track kit is installed, and a wheel mode in which said vehicle body is equipped with a wheel kit instead of said track kit, said wheel kit comprising ground-engaging wheels on said opposite sides of said hybrid vehicle body that are driven by said wheel drives, said hybrid vehicle further of the type comprising an electronic circuit capable of processing data, storing data and capable of data input and output, said method comprising the steps of:

calculating in said electronic circuit speed data on the basis of a speed signal acquired by a speed sensor connected to a speed device;

receiving in said electronic circuit a driving mode signal from a mode selector device and determining whether said driving mode signal corresponds to said track mode or said wheel mode;

if said driving mode signal corresponds to said track mode
   acquiring, in said electronic circuit track steering data from a track steering sensor connected to a steering device;
   calculating in said electronic circuit driving hydraulic rate data from said track steering data and said speed data; and
   administering a driving hydraulic rate to each said driving servo-pump which is representative of said hydraulic rate data for propelling and steering said hybrid vehicle;

if said driving mode signal corresponds to said wheel mode
   calculating said driving hydraulic pumps hydraulic rate data from said speed data;
   administering a driving hydraulic rate which is representative of said hydraulic rate data to said driving hydraulic pumps for propelling said hybrid vehicle; and
   steering said hybrid vehicle with a wheel mode directional system.

In one embodiment, said wheel mode directional system comprises a wheel mode directional hydraulic pump hydraulically connected to a wheel mode steering actuator for selectively controlling the direction of said hybrid vehicle, said method further comprising the steps of:
   if said driving mode signal corresponds to said track mode disabling said wheel mode steering actuator; and
   if said driving mode signal corresponds to said wheel mode enabling said wheel mode steering actuator to allow said steering device to control said wheel mode directional hydraulic pump for controlling the direction of said hybrid vehicle.

In one embodiment, said wheel mode directional system further comprises a pivot pivotally linking chassis front and rear portions each supported by respective said ground-engaging wheels, said wheel mode steering actuator being connected to said chassis front and rear portions, the step of steering said hybrid vehicle with said wheel mode steering system comprising: controlling said wheel steering actuator with said wheel mode directional hydraulic pump to force said chassis front and rear portions to pivot relative to each other thereby steering said hybrid vehicle when it is in said wheel mode.

In one embodiment, said wheel mode steering actuator comprises first and second hydraulic cylinders linking said chassis front and rear portions on either side of said pivot, the step of controlling said wheel steering actuator with said wheel mode directional hydraulic pump comprising: effecting either one of a combined retraction of said first cylinder and extraction of said second cylinder to steer said hybrid vehicle in a first direction, and a combined extraction of said first cylinder and retraction of said second cylinder to steer said hybrid vehicle in a second direction.

In one embodiment, the method further comprises the following steps
   calculating said speed data further on the basis of a motor running speed data which is representative of the motor running speed, in addition to calculating said speed data on the basis of said speed signal;
   receiving in said electronic circuit an operation signal from an operation selector device determining whether said hybrid vehicle is in a displacement mode or in a work mode;
   if said hybrid vehicle is in said work mode, fixing said motor running speed at a determined value.

In one embodiment, the method further comprises the steps of:
   receiving in said electronic circuit a transmission signal data;
   determining a transmission state from said transmission signal data;
   if said transmission state corresponds to a reverse state, encoding said driving hydraulic rate data with a reverse state parameter.

In one embodiment, said wheel kit includes front and rear drive wheel sets that are driven by respective wheel drives, said method further comprising the following step if said driving mode signal corresponds to said track mode: receiving in said electronic circuit a track speed adjustment command and relatively adjusting said hydraulic rate data of said first and second driving hydraulic pumps to redress minute hydraulic rate data errors destabilizing said hybrid vehicle from a linear driving trajectory.

In one embodiment, the method further comprises the following step if said driving mode signal corresponds to said wheel mode: receiving in said electronic circuit a wheel speed adjustment command and relatively adjusting said hydraulic rate data of said first and second driving hydraulic pumps by small predetermined iterative adjustment values to rectify unequal rear and front hybrid vehicle wheel set speeds.

In one embodiment, said speed data includes first data from an accelerator device and second data from a brake device, with said first data providing a target speed hydraulic rate data value which will be used to calculate said hydraulic rate data according to a desired speed of said hybrid vehicle, and with said second data reducing said target speed data by a braking factor which is representative of a braking intensity of said brake device.

According to another aspect, the present invention relates to a hybrid vehicle kit comprising a vehicle body capable of being interchangeably coupled to either one of a wheel kit thus forming a hybrid vehicle in a wheel mode, said wheel kit comprising a number of ground-engaging wheels; and a track kit, thus forming said hybrid vehicle in a track mode, said track kit comprising a pair of ground-engaging tracks carried by track wheels, said vehicle body comprising
   a chassis carrying a motor;
   two driving hydraulic pumps carried by said chassis and powered by said motor;

a number of wheel drives powered by a corresponding one of said driving hydraulic pumps;

an electronic circuit capable of processing data, storing data and capable of data input and output, said electronic circuit operatively connected to said driving hydraulic pumps for controlling the hydraulic liquid feed rate of said driving hydraulic pumps;

a mode selector device capable of receiving a command and to emit a corresponding driving mode signal to said electronic circuit, said driving mode signal identifying said hybrid vehicle to be in either one of said track mode and said wheel mode;

a speed device capable of transmitting a speed signal to said electronic circuit that will in turn calculate speed data on the basis of said speed signal;

a steering device capable of transmitting a track steering signal to said electronic circuit that will in turn calculate track steering data on the basis of said track steering signal; and a wheel mode directional system allowing said hybrid vehicle to be steered when it is in said wheel mode;

wherein in said wheel mode said ground-engaging wheels are operatively mounted to corresponding said wheel drives, said electronic circuit calculating hydraulic rate data on the basis of said speed data to control said first and second driving hydraulic pumps so that they will administer a hydraulic rate to said wheel drives which is representative of said hydraulic rate data to control the rotational speed of said ground-engaging wheels which will propel said hybrid vehicle; and wherein in said track mode at least some of said track wheels are operatively mounted to corresponding said wheel drives, said electronic circuit calculating hydraulic rate data on the basis of said speed data and of said track steering data to control said first and second driving hydraulic pumps so that they will administer a respective hydraulic rate to said wheel drives which is representative of said hydraulic rate data to control the rotational speed of said at least some of said track wheels that are operatively mounted to corresponding said wheel drives, to both propel and steer said hybrid vehicle.

In one embodiment, said electronic circuit comprises a microcontroller.

In one embodiment, in said track mode said vehicle body comprises a removable track wheel framework carrying at least a portion of said track wheels.

In one embodiment, said wheel mode directional system comprises a wheel mode directional hydraulic pump hydraulically connected to a wheel mode steering actuator for selectively controlling the direction of said hybrid vehicle, whereby if said hybrid vehicle is in said track mode said wheel mode steering actuator is disabled, and if said hybrid vehicle is in said wheel mode said wheel mode steering actuator is enabled to allow said steering device to control said wheel mode directional hydraulic pump for controlling the direction of said hybrid vehicle.

In one embodiment, said wheel mode directional system further comprises a pivot pivotally linking chassis front and rear portions each supported by respective said ground-engaging wheels, said wheel mode steering actuator being connected to said chassis front and rear portions, whereby said wheel steering actuator is controlled with said wheel mode directional hydraulic pump to force said chassis front and rear portions to pivot relative to each other thereby steering said hybrid vehicle when it is in said wheel mode.

In one embodiment, said wheel mode steering actuator comprises first and second hydraulic cylinders linking said chassis front and rear portions on either side of said pivot, whereby either one of a combined retraction of said first cylinder and extraction of said second cylinder to steer said hybrid vehicle in a first direction, and a combined extraction of said first cylinder and retraction of said second cylinder to steer said hybrid vehicle in a second direction, is effected.

According to yet another aspect, the present invention relates to a powered hybrid vehicle capable of being operative in either one of first and second distinct driving modes each comprising corresponding first and second directional systems, said hybrid vehicle comprising:

a control shaft operatively coupled to a steering device;

a first steering member operatively coupled to said first directional system;

a second steering member operatively coupled to said second directional system;

a shaft coupler capable of selectively coupling said control shaft to either one of said first and second steering members;

wherein said hybrid vehicle may be steered by controlling said steering device notwithstanding which one of said first and second driving mode it is in.

In one embodiment, said first and second steering members are respectively first and second steering shafts.

The present invention further relates to a hybrid vehicle kit comprising a vehicle body capable of being interchangeably coupled to either one of a wheel kit comprising a number of ground-engaging wheels that can be mounted to said vehicle body and a track kit comprising a pair of ground-engaging tracks carried by track wheels that can be mounted to said vehicle body, said vehicle body comprising a chassis carrying a motor;

a control shaft mounted to said chassis and operatively coupled to a steering device;

a wheel mode steering shaft mounted to said chassis and operatively coupled to a wheel mode directional system;

a track mode steering shaft mounted to said chassis and operatively coupled to a track mode directional system; and a shaft coupler capable of selectively coupling said control shaft to either one of said wheel mode steering shaft and to said track mode steering shaft;

wherein a hybrid vehicle may be formed in either one a wheel mode by assembling said vehicle body and said wheel kit and by coupling said control shaft to said wheel mode steering shaft whereby said hybrid vehicle can be driven by said motor rotating at least some of said ground-engaging wheels and can be oriented with said wheel mode directional system; and a track mode by assembling said vehicle body and said track kit and by coupling said control shaft to said track mode steering shaft whereby said hybrid vehicle can be driven by said motor rotating at least some of said track wheels and can be oriented with said track mode directional system, and wherein said hybrid vehicle may be steered by controlling said steering device notwithstanding whether it is in said wheel mode or in said track mode.

In one embodiment, said shaft coupler comprises a wheel mode sleeve that rotates together with said wheel mode steering shaft and a track mode sleeve that rotates together with said track mode steering shaft, said wheel and track mode sleeves both freely engaging said control shaft, said shaft coupler further comprising a selective link for selectively linking in rotation either one of said wheel and track mode sleeves to said control shaft.

In one embodiment, said selective link comprises a pin capable of engaging either one of a first set of apertures formed coextensively within said wheel mode sleeve and said control shaft and a second set of apertures formed coextensively within said track mode sleeve and said control shaft.

In one embodiment, said wheel mode directional system comprises a pivot pivotally linking front and rear portions of said chassis, said chassis front and rear portions each carrying respective said ground-engaging wheels, and a wheel mode steering actuator linking said chassis front and rear portions, whereby upon said wheel mode steering shaft being rotated, said wheel mode steering actuator will force said chassis front and rear portions to pivot relative to each other thereby steering said hybrid vehicle in a corresponding direction when it is in said wheel mode.

In one embodiment, said wheel mode steering actuator comprises first and second hydraulic cylinders linking said chassis front and rear portions on either side of said pivot, with the combined retraction of said first cylinder and extraction of said second cylinder steering said hybrid vehicle in a first direction and with the combined extraction of said first cylinder and retraction of said second cylinder steering said hybrid vehicle in a second direction opposite said first direction.

In one embodiment, said wheel mode steering actuator further comprises a wheel mode steering hydraulic pump connected to a wheel mode steering valve which will control hydraulic fluid flow within said first and second cylinders to allow determined simultaneous respective retraction and extraction of said first and second cylinders when said control shaft is rotated by said steering device.

In one embodiment, said track mode directional system comprises a potentiometer mounted to said steering shaft detecting the angular position of said track mode steering shaft, whereby the relative speed of said pair of ground-engaging tracks can be relatively adjusted according to said angular position of said track mode steering shaft.

DETAILED DESCRIPTION OF THE EMBODIMENTS

Figure 4:
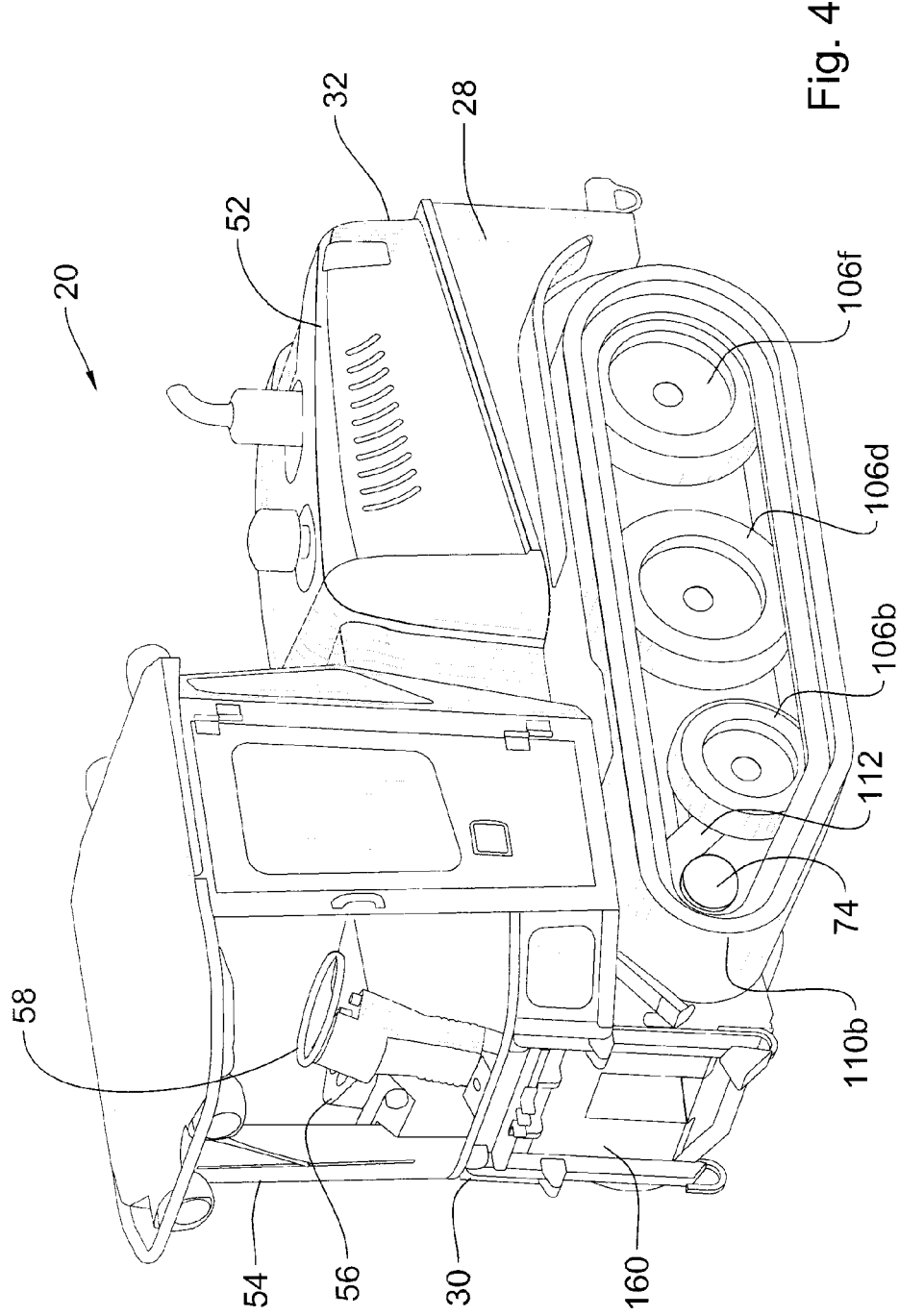
FIG. 4 is a top perspective view of a hybrid vehicle according to the present invention in its track mode.
Figure 5:
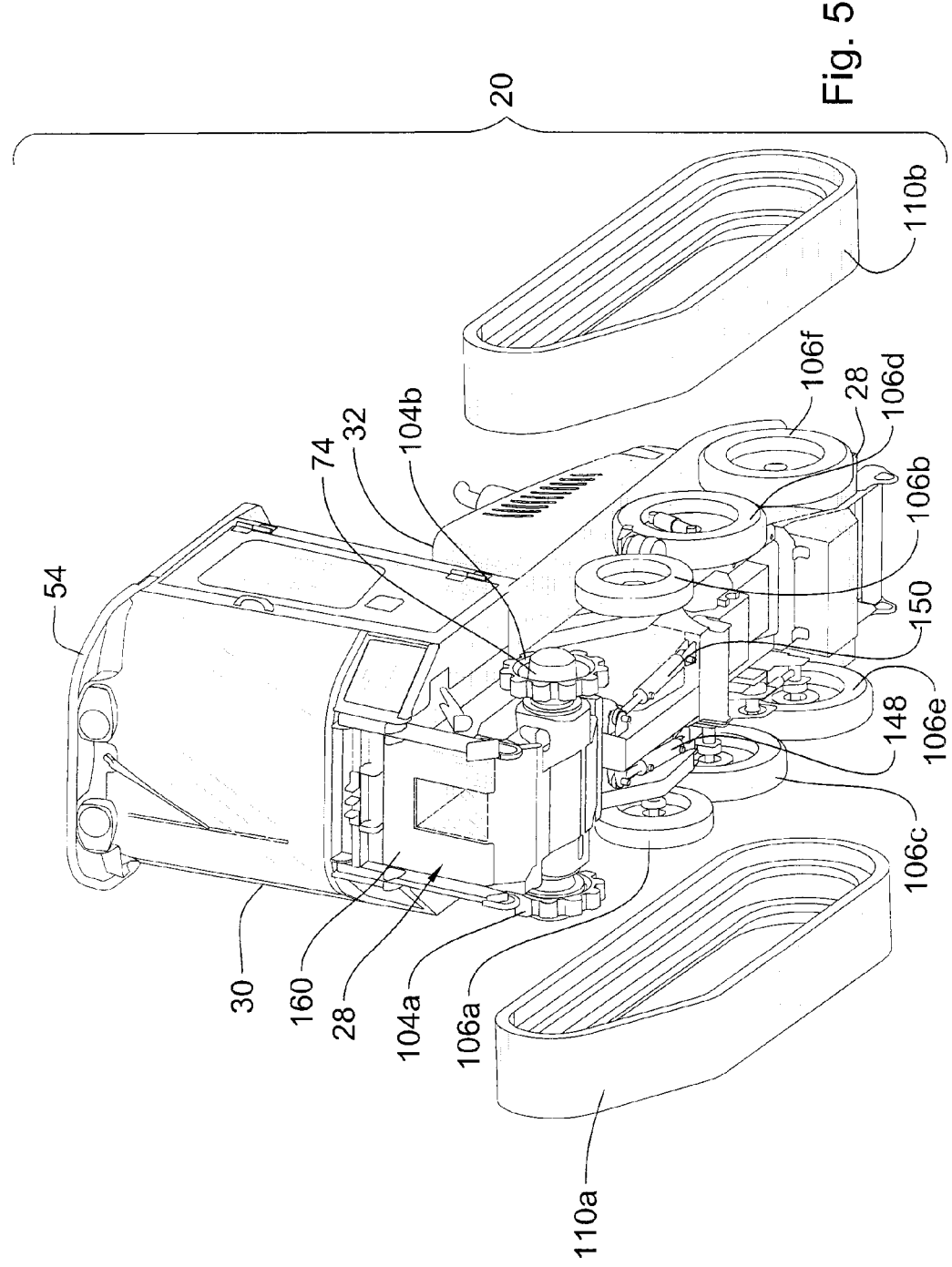
FIG. 5 is bottom perspective view of the hybrid vehicle of FIG. 4 with the tracks being exploded away from the vehicle.
Figure 6:
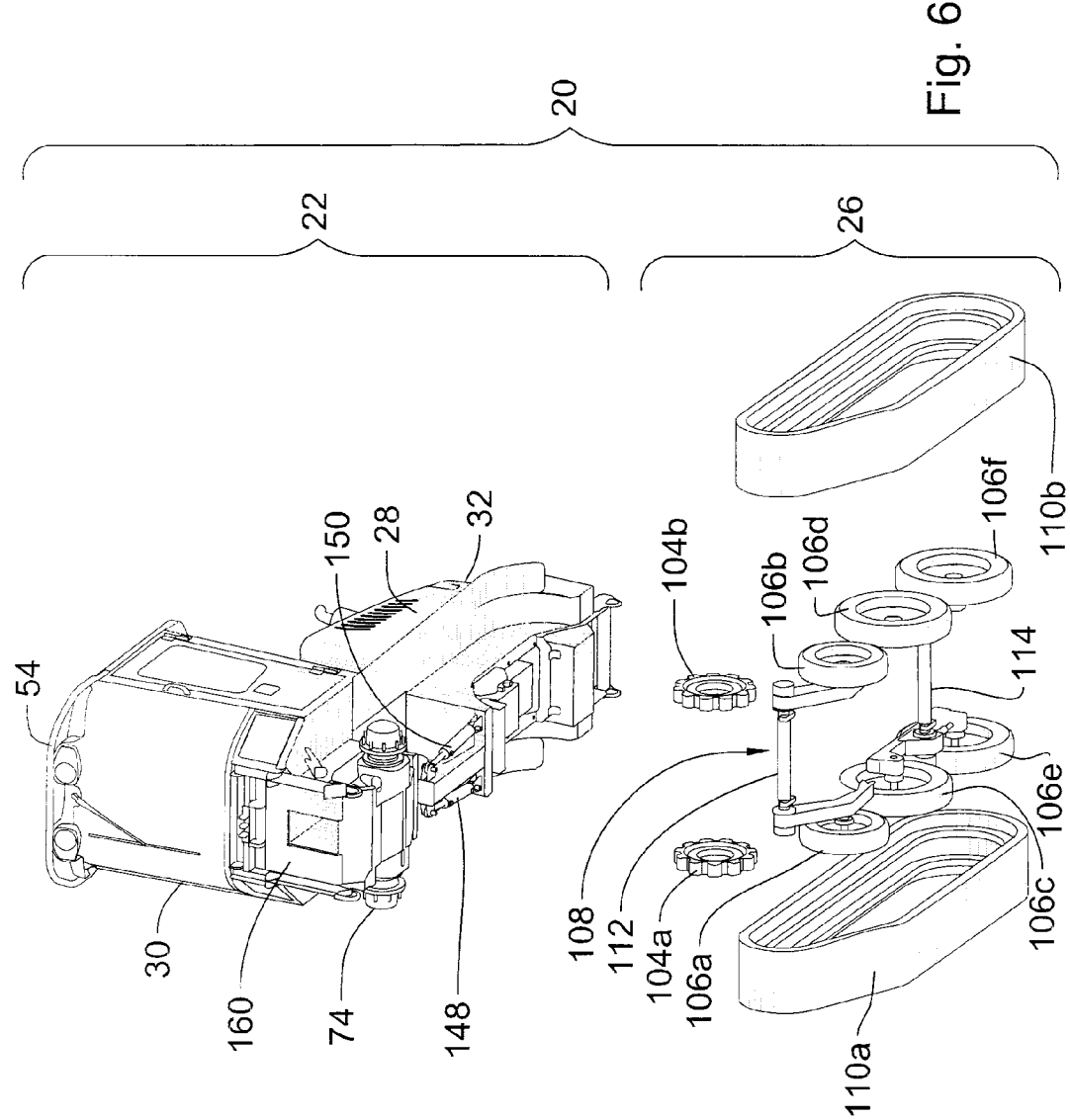
FIG. 6 is a view similar to FIG. 4 but with the entire track kit of the hybrid vehicle being exploded away from the vehicle body.

FIGS. 1-7 show a hybrid vehicle 20 according to the present invention. Hybrid vehicle 20 can interchangeably adopt either one of a wheel mode shown in FIGS. 1-3 and a track mode shown in FIGS. 4-6, as detailed hereinafter. To obtain these two distinct driving modes, the invention provides for a hybrid vehicle kit comprising a vehicle body 22, a wheel kit 24 (FIG. 3) and a track kit 26 (FIG. 6). Vehicle 20 will be in its wheel mode by assembling wheel kit 24 with vehicle body 22 and in its track mode by assembling track kit 26 with vehicle body 22.

Figure 7:
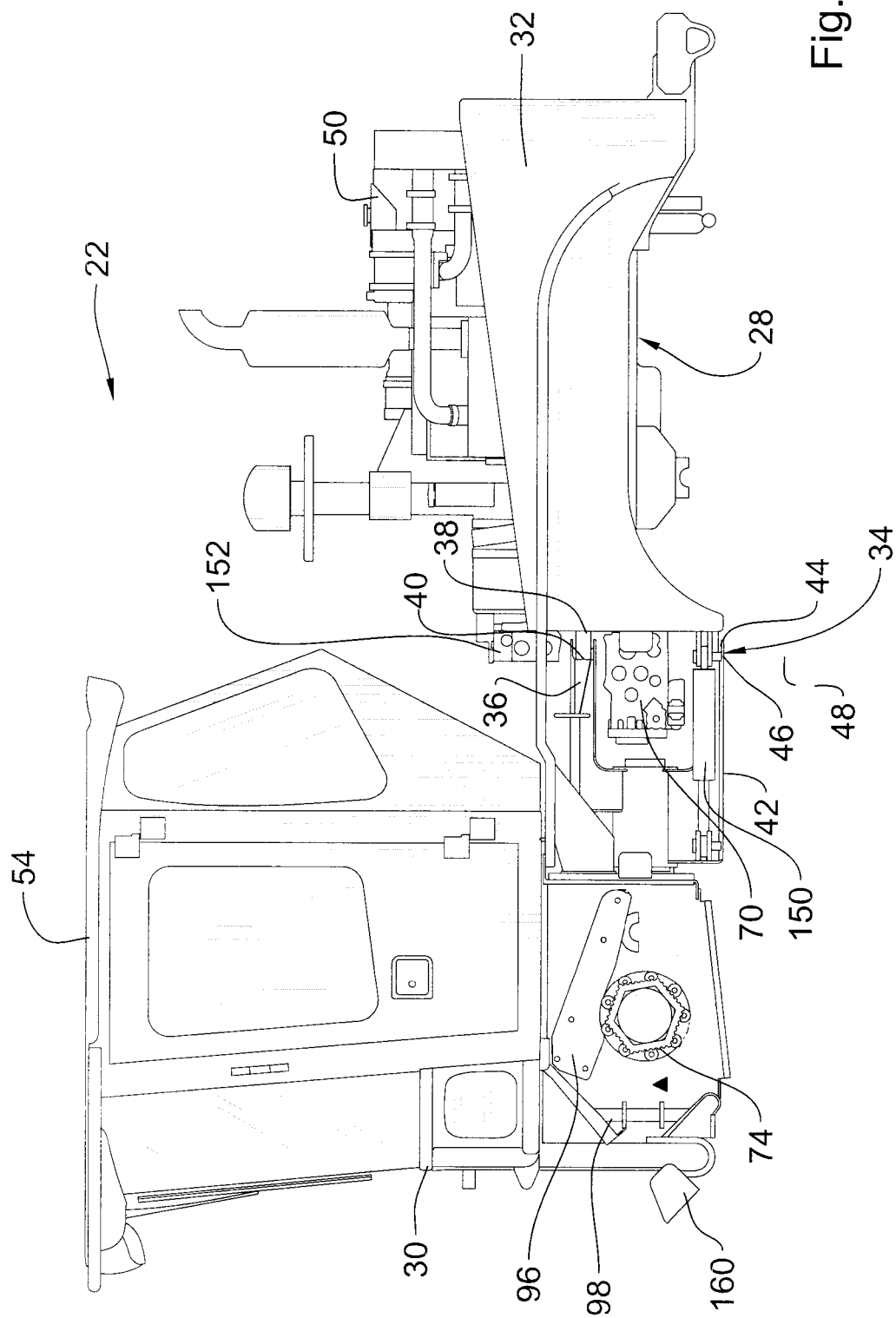
FIG. 7 is a side elevation of the vehicle body only of the hybrid vehicle, and with the hood removed on the rear chassis portion to show the motor.

Vehicle body 22 comprises a chassis 28 which has chassis front and rear portions 30 and 32 which are pivotally linked by a pivot 34 (FIG. 7). Pivot 34 has upper and lower pivot members in the form of an upper front chassis arm 36 fixed to chassis front portion 30 and linked by an upper pivot bolt 40 to an upper rear chassis arm 38 fixed to chassis rear portion 32. Pivot 34 further has a lower front chassis and 42 fixed to chassis front portion 30 and linked by a lower pivot bolt 46 to a lower rear chassis arm 44 fixed to chassis rear portion 32. Pivot 34 allows the chassis front and rear portions to pivot relative to each other about a vertical axis 48.

Chassis rear portion 32 carries a motor 50 which is normally concealed under a hood 52 although the latter is removed in FIG. 7. Motor 50 can be any suitable type of motor such as, for example, a diesel motor.

Figure 8:
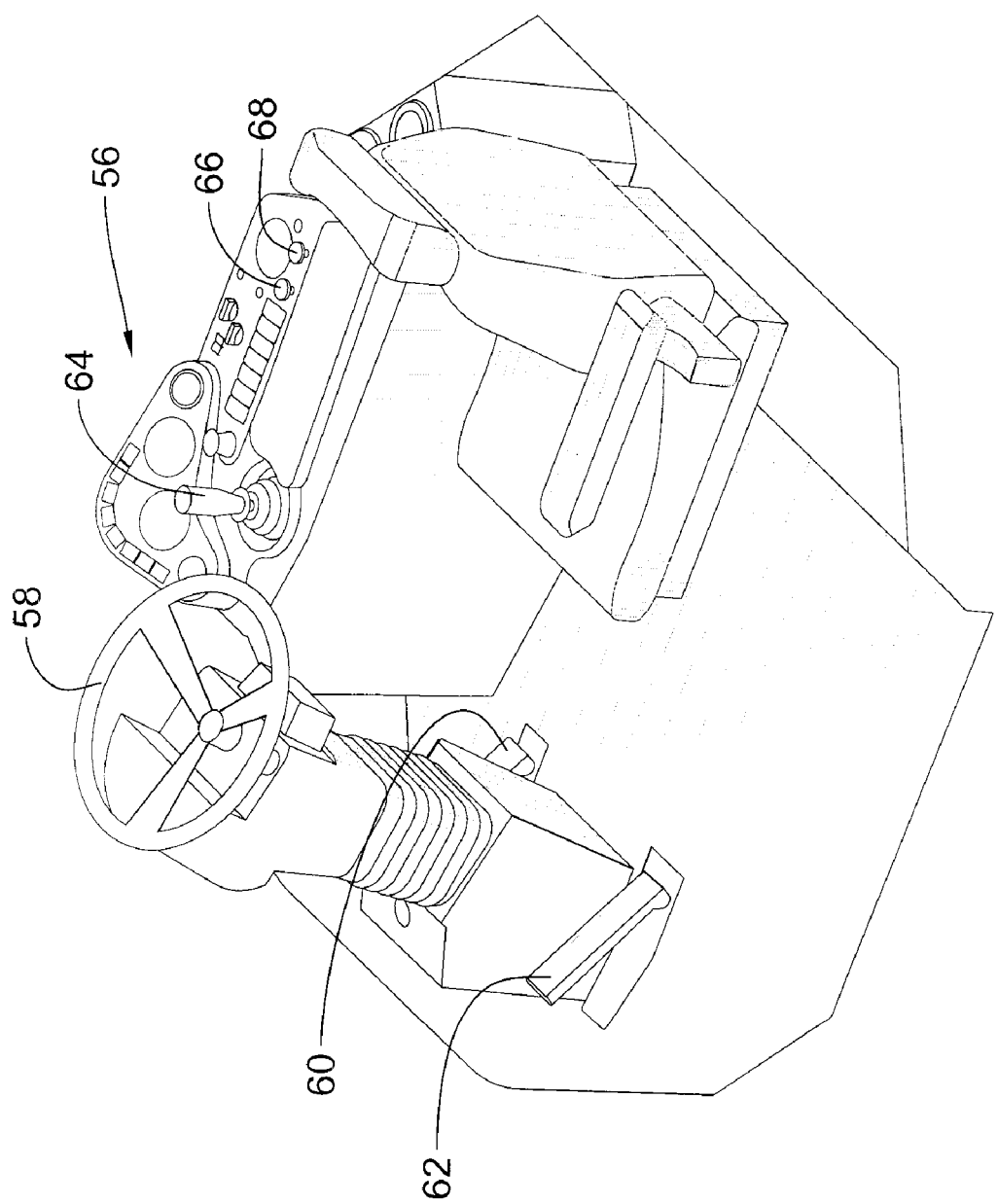
FIG. 8 is an enlarged top perspective view of the interior of the cabin of the hybrid vehicle of the present invention, showing particularly some elements of the control panel.

Chassis front portion 30 carries a cabin 54 for use by a vehicle driver. As suggested in FIG. 8, cabin 54 includes suitable amenities together with a control panel 56 including a steering device such as a steering wheel 58, a speed device such as the combination of an accelerator pedal 60 and a brake pedal 62, a transmission stick 64 and a mode selector device such as a pair of mode selector buttons 66, 68 that respectively correspond to the wheel mode and the track mode of hybrid vehicle 20.

FIGS. 1-7 show that hybrid vehicle 20 further comprises a pair of hydraulic driving pumps 70, 72 (see FIG. 7 where pump 72 is concealed, and FIG. 11 where both pumps are schematically illustrated) that are powered by motor 50 and carried by chassis rear portion 32. Pumps 70, 72 may also be linked to an auxiliary load pump (not shown) which may pump additional hydraulic fluid from a hydraulic fluid reservoir (not shown) to compensate hydraulic fluid leaks. Otherwise than to compensate fluid leaks, pumps 70, 72 do not require any fluid intake since they work in a closed loop system. The hydraulic fluid running through pumps 70, 72 can be any suitable fluid such as oil. Hydraulic pumps 70, 72 may be hydrostatic pumps.

Hybrid vehicle 20 also comprises a front actuator assembly 74 carried by chassis front portion 30. Front actuator assembly 74 is more particularly installed underneath cabin 30.

Figure 9:
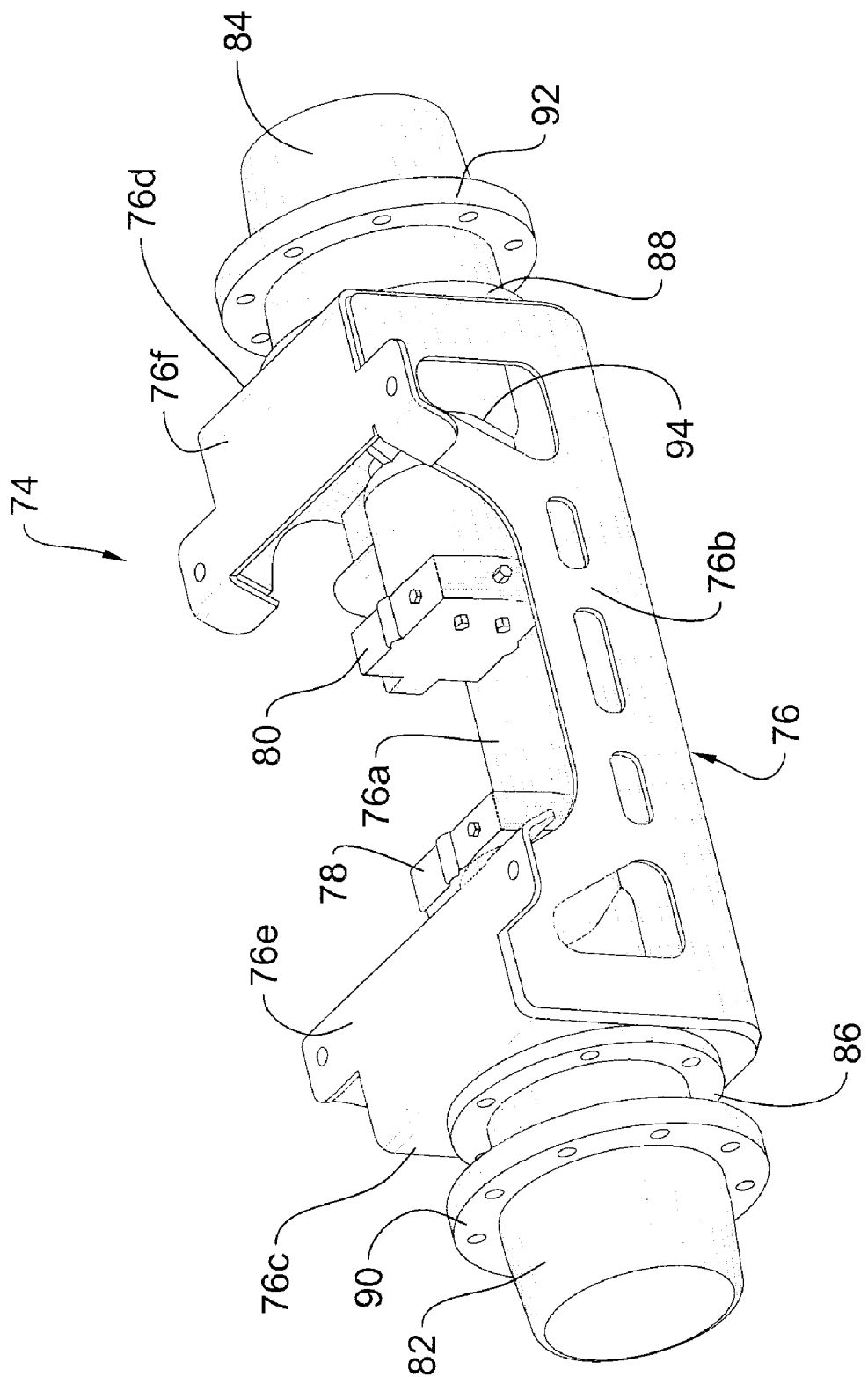
FIG. 9 is an enlarged top perspective view of the front actuator assembly of the hybrid vehicle of the present invention, which is similar to the rear actuator assembly.

Front actuator assembly 74, which can be seen in greater detail in FIG. 9, comprises an elongated casing 76 defining an opened inner compartment between a bottom wall 76a, a lateral wall 76b upstanding from bottom wall 76a, two end walls 76c, 76d also upstanding from bottom wall 76a, and two attachment tabs 76e, 76f attached inwardly perpendicularly to end walls 76c, 76d opposite bottom wall 76a. Casing 76 carries in its inner compartment a pair of hydraulic motors 78, 80 that are operatively connected to one of or both hydraulic pumps 70, 72. That is to say, hydraulic motors 78, 80 may be connected to the same hydraulic pump 70 or 72, or each to a different hydraulic pump 70 and 72 respectively, as the case may be and as will be detailed hereinafter. In any event, hydraulic motors 78, 80 can be hydraulically powered by one of or both pumps 70, 72 by being fed with hydraulic fluid. Each hydraulic motor 78, 80 is in turn operatively connected to a corresponding planetary gear box 82, 84 extending through holes made in casing end walls 76*c*, 76*d* and fixed to end walls 76*c*, 76*d* with flanges 86, 88 that are bolted thereto. Each planetary gear box 82, 84 is equipped with a wheel attachment flange 90, 92 for allowing a wheel to be releasably attached thereto.

The combination of a planetary gear box 82, 84 with its corresponding hydraulic motor 78, 80 will hereafter be referred to as a planetary wheel drive or simply as a wheel drive.

Each wheel drive 78, 82 and 80, 84 is also equipped with a disk brake 94 (with one disk brake being concealed in FIG. 9).

Front actuator assembly 74 is attached with its attachment tabs 76*e*, 76*f* to a pivotable actuator support arm 96 which is pivotally mounted to the underside of chassis front portion 30. A pivot actuator 98 carried by chassis front portion 30 controls the pivotal displacement of front actuator assembly 74. This allows front actuator assembly 74 to be pivoted between a raised position shown in full lines in FIG. 7 and a lowered position shown in phantom lines in FIG. 7, for reasons 2 detailed hereinafter. Front actuator assembly 74 is not intended to be removed from actuator support arm 96 once it is installed thereon, except perhaps for maintenance reasons.

Figure 1:
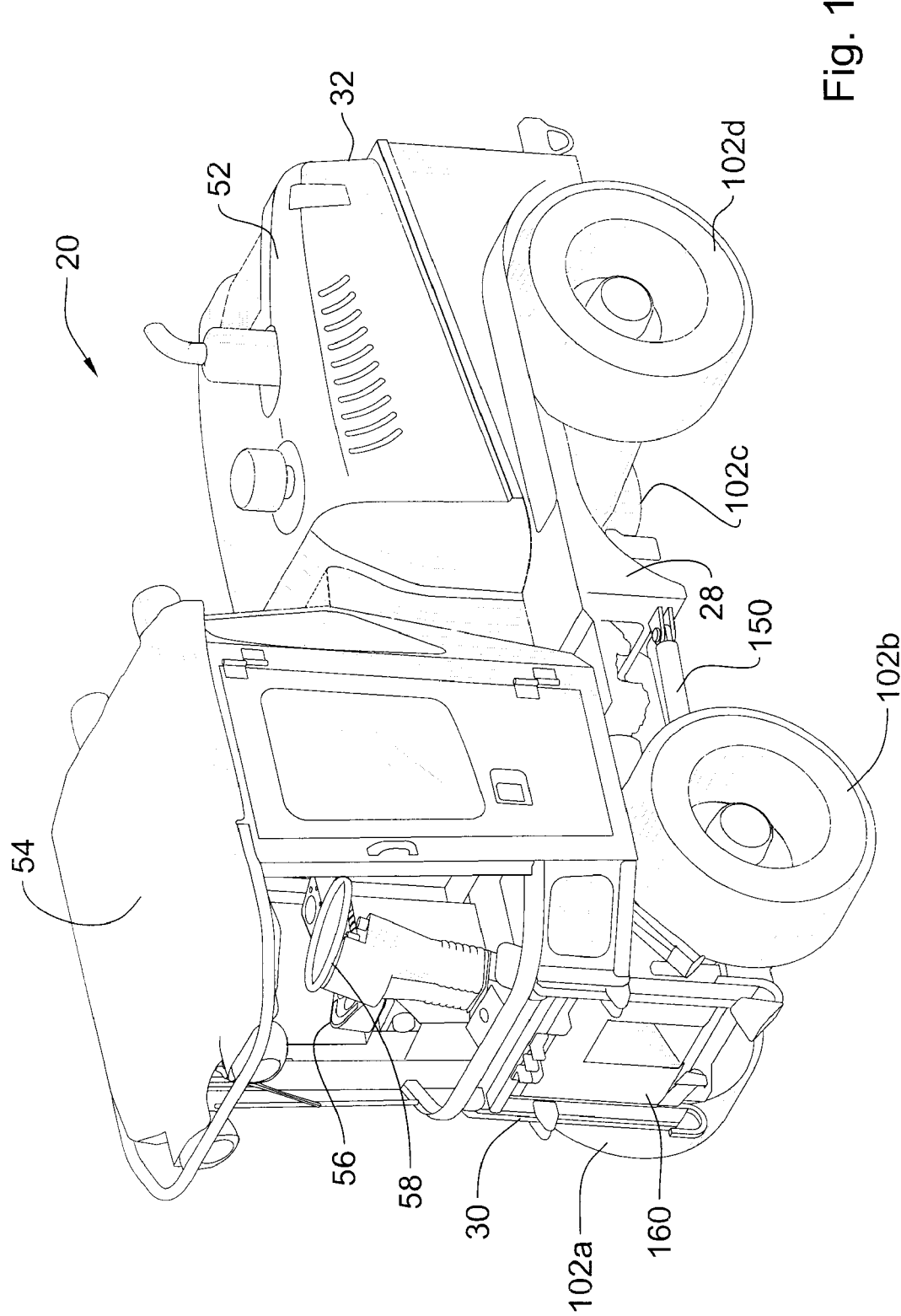
FIG. 1 is a top perspective view of a hybrid vehicle according to the present invention in its wheel mode.
Figure 2:
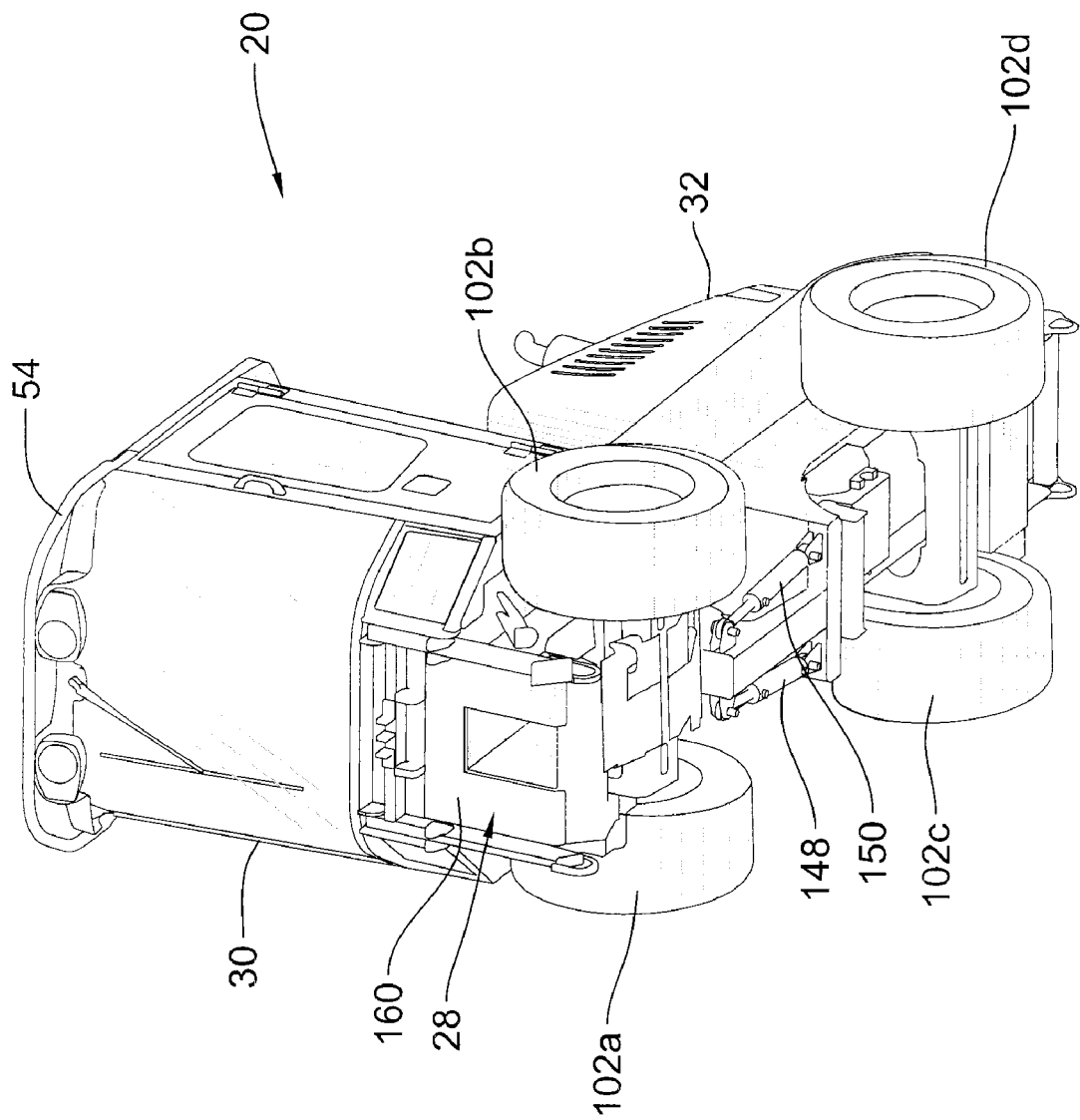
FIG. 2 is bottom perspective view of the hybrid vehicle of FIG. 1.
Figure 3:
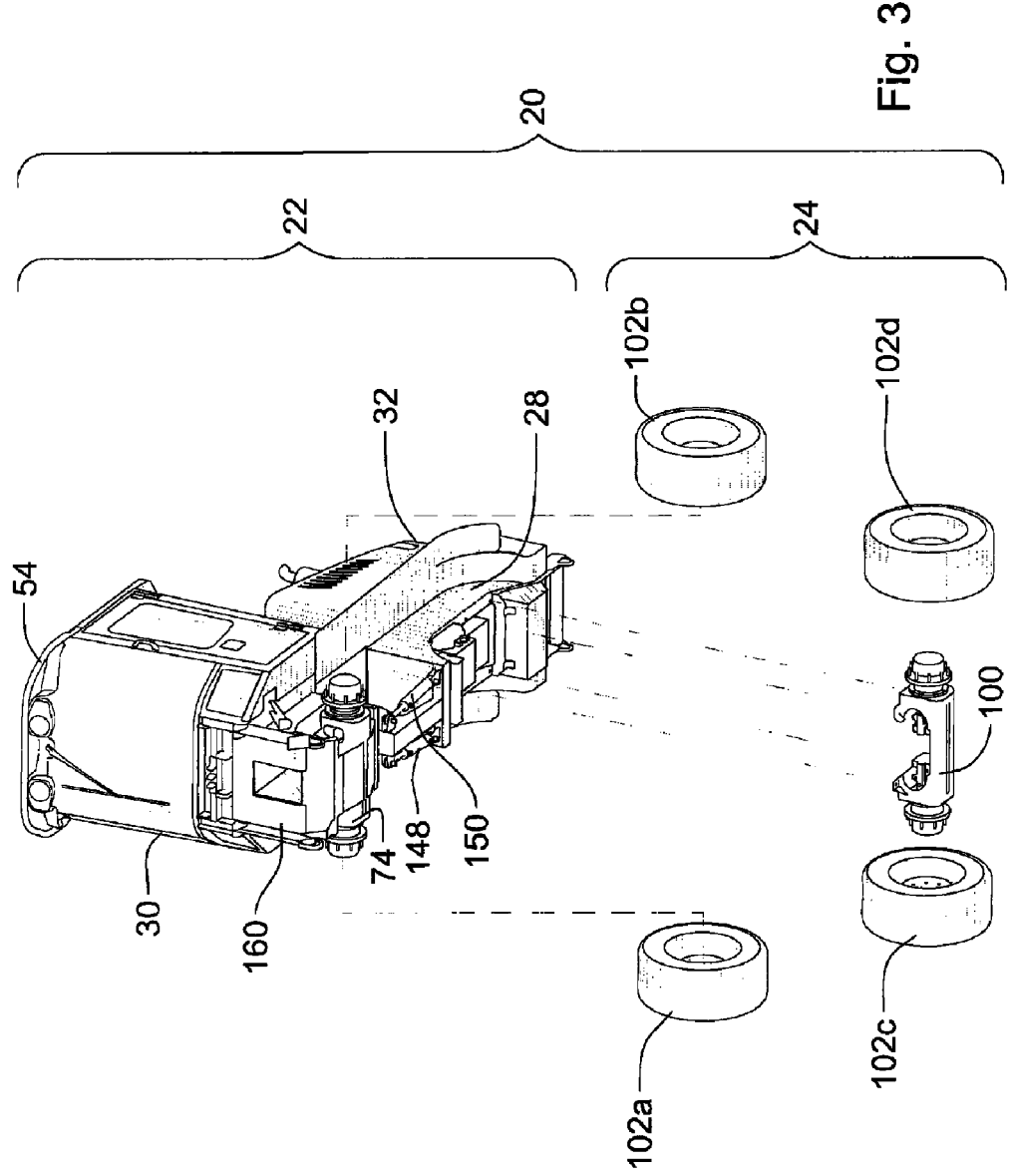
FIG. 3 is a view similar to FIG. 2 but with the wheel kit of the hybrid vehicle being exploded away from the vehicle body.

FIGS. 1-3 show that hybrid vehicle 20 is equipped with wheel kit 24 in its wheel mode. Wheel kit 24 comprises a rear actuator assembly 100 which is similar to front actuator assembly 74 and which will consequently not be described in further details. Rear actuator assembly 100 is hydraulically powered by a single one of the two hydraulic pumps 70, 72. Rear actuator assembly 100 is removably attached to the underside of rear chassis portion 32 with its attachment tabs.

Wheel kit 24 further comprises a number of ground-engaging wheels, e.g. four ground-engaging wheels 102*a*, 102*b*, 102*c*, 102*d* as shown in the drawings, which may collectively or individually be referred to as ground-engaging wheels 102. Ground-engaging wheels 102 are attached to respective wheel drives of the front and rear actuator assemblies 74, 100, and more particularly to the planetary gear box wheel attachment flanges thereof. Thus, when vehicle body 22 is equipped with wheel kit 24, it has four power-driven ground-engaging wheels that can be rotated by means of the two driving hydraulic pumps 70, 72. More particularly first pump 70 will feed the wheel drives of front actuator assembly 74, while second pump 72 will feed the wheel drives of rear actuator assembly 100.

It is noted that additional ground-engaging wheels could be added to vehicle 20 in its wheel mode, in particular if those wheels are idle wheels (i.e. not power-driven). These additional wheels could then be installed on chassis 28 with only minor modifications to the design of the latter to accommodate these additional wheels.

FIGS. 4-6 show that hybrid vehicle 20 is equipped with track kit 26 in its track mode. Track kit 26 comprises a pair of toothed track driving wheels 104*a*, 104*b* which may collectively or individually be referred to as track driving wheels 104; six track guide wheels 106*a*, 106*b*, 106*c*, 106*d*, 106*e*, 106*f* which may collectively or individually be referred to as track guide wheels 106; a track wheel framework 108 and a pair of ground-engaging endless tracks 110*a*, 110*b* which may collectively or individually be referred to as tracks 110.

In the hybrid vehicle track mode, track wheel framework 108 is removably attached to chassis 28, and more particularly to both the chassis front and rear portions 30, 32. Track wheel framework 108 includes a U-shaped front guide wheel support arm 112 which is removably mounted to the underside of chassis front portion 30. Preferably, front guide wheel support arm 112 is pivotally mounted to chassis front portion 30 and a shock absorber allows it some pivotal movement leeway, so as to absorb shocks and also tension tracks 110. Track wheel framework 108 further includes an H-shaped rear guide wheel support arm 114 which is removably mounted to chassis rear portion 32. Rear guide wheel support arm 114 carries the intermediate and rear guide wheels 106*c*, 106*d* and 106*e*, 106*f*.

The toothed track driving wheels 104 are both operatively coupled to the wheel attachment flanges of the wheel drives of front actuator assembly 74. The two wheel drives 78, 82 and 80, 84 of front actuator assembly 74 are connected to a respective hydraulic pump 70, 72 in the track mode of hybrid vehicle 20; that is to say, the two track mode vehicle drive wheels, which are located on opposite sides of vehicle 20, are hydraulically powered by a corresponding one of pumps 70, 72.

Endless tracks 110 are installed on either side of vehicle body 22, so as to be carried by respective guide and drive wheels 106 and 104.

In the hybrid vehicle track mode, it is noted that hybrid vehicle 20 is not equipped with a rear actuator assembly 100, the latter being undesirable in the case of a track-propelled vehicle. Indeed, having hypothetical additional rear track driving wheels would result in the tracks 110 loosening in some circumstances which could lead to tracks 110 accidentally disengaging from their guide and drive wheels. Furthermore, the absence of a rear actuator assembly 100 on hybrid vehicle 20 in its track mode allows the installation of the track wheel framework 108 which occupies the space left vacant by the absent rear actuator assembly 100. Consequently only front track driving wheels 104 and a front actuator assembly 74 are present on the hybrid vehicle track mode. It is thus a desirable and advantageous aspect of the present invention to provide a removable rear actuator assembly 100.

Figure 10:
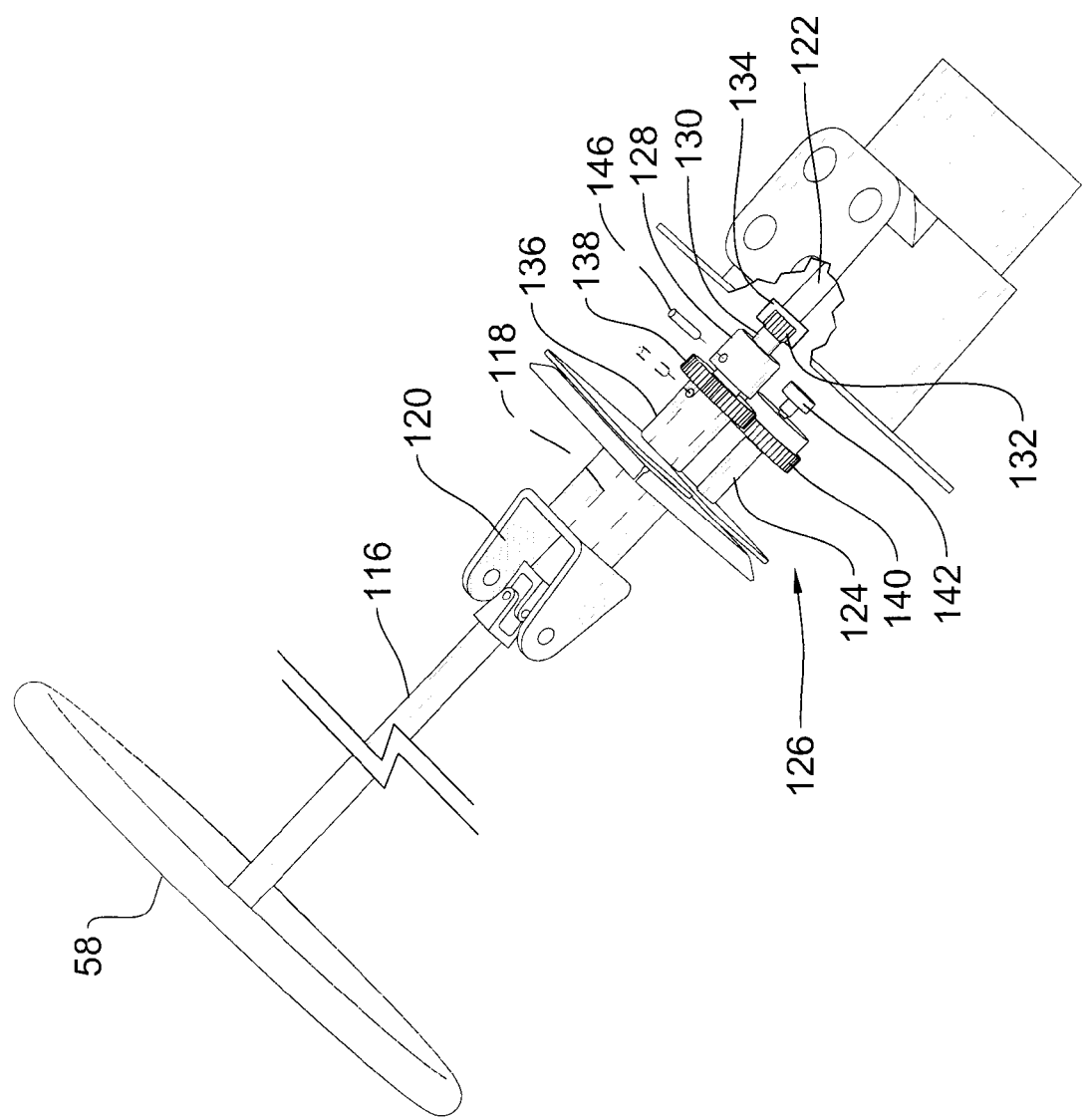
FIG. 10 is a partial side elevation of the dual steering mechanism of the hybrid vehicle of the present invention including the steering wheel, the steering wheel support shaft, the control shaft, the shaft coupler, the wheel mode steering shaft and the track mode steering shaft.
Figure 11:
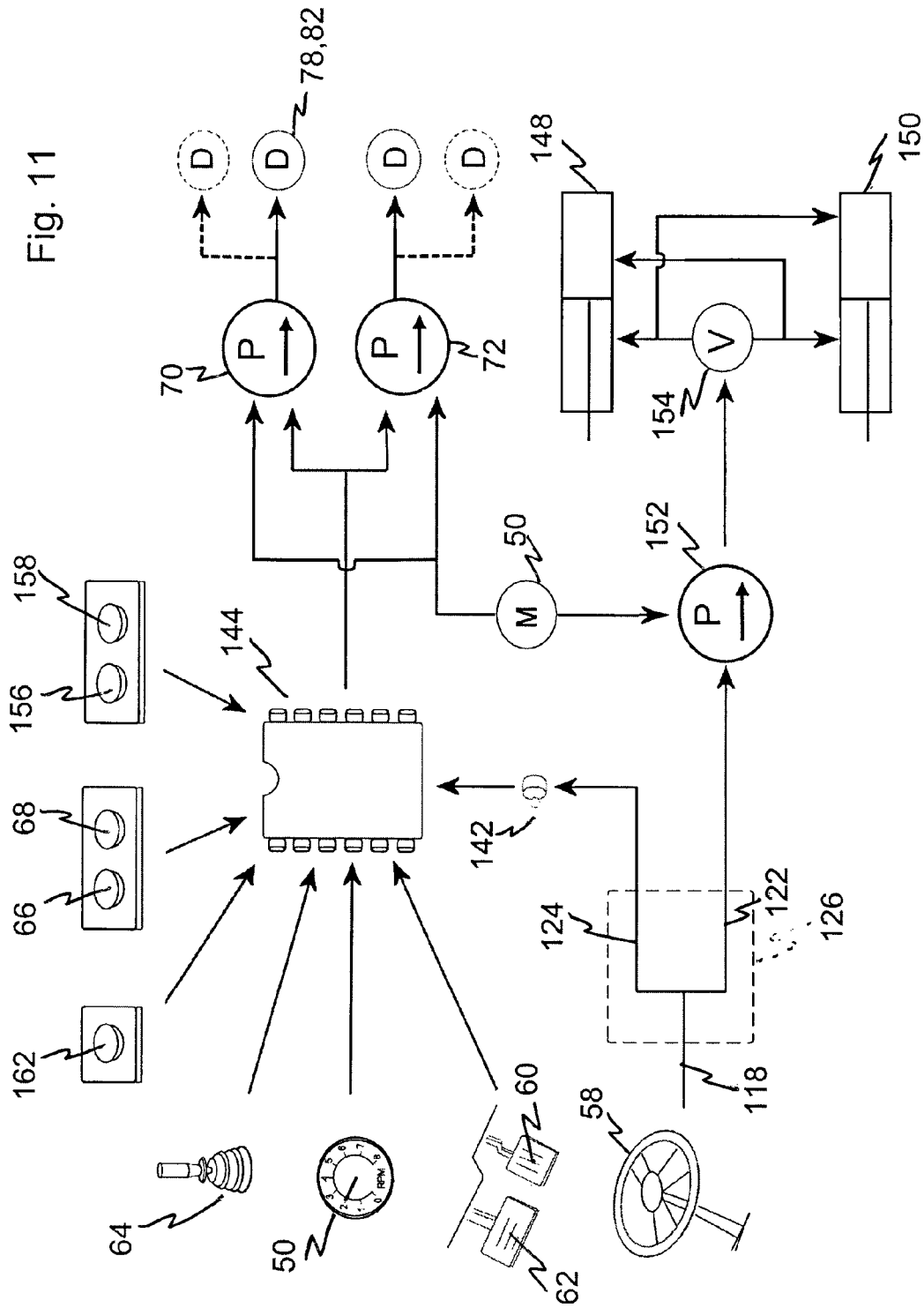
FIG. 11 is a schematic view of different elements that are part of the electronic or hydraulic networks of the hybrid vehicle of the present invention.

FIGS. 10 and 11 help to show how hybrid vehicle 20 may be steered and propelled in both its wheel and track modes.

More particularly, hybrid vehicle 20 comprises two distinct directional systems to control the orientation of vehicle 20 during use depending on whether it is in its wheel mode or its track mode, namely a wheel mode directional system and a track mode directional system. However, hybrid vehicle 20 may be steered by controlling steering wheel 58 notwithstanding which driving mode is selected as detailed hereinafter.

As shown in FIG. 10, steering wheel 58 is mounted to a steering wheel support shaft 116 that is in turn coupled to a control shaft 118 through the instrumentality of a pivoting shaft link 120 of known construction, which transmits the rotational movement of steering wheel support shaft 116 to control shaft 118. Both steering wheel support shaft 116 and control shaft 118 are rotatably mounted to chassis front portion 30.

Hybrid vehicle 20 comprises a wheel mode steering shaft 122 rotatably mounted to the chassis front portion 30 and operatively coupled to the wheel mode directional system described hereinafter; a track mode steering shaft 124 rotatably mounted to chassis front portion 30 and operatively coupled to the track mode directional system also described hereinafter; and a shaft coupler 126 capable of selectively coupling control shaft 118 to either one of wheel mode steering shaft 122 and track mode steering shaft 124. Shaft coupler 126 comprises a wheel mode sleeve 128 that rotates together with wheel mode steering shaft 122 due to a connecting shaft 130 that is integrally linked to wheel mode sleeve 128 and that engages with a toothed male end 132 thereof a correspondingly formed toothed female end 134 in wheel mode steering shaft 122. Shaft coupler 126 also comprises a track mode sleeve 136 that rotates together with track mode steering shaft 124 by means of a geared flange 138 integrally installed on the outer periphery of track mode sleeve 136 which operatively engages a corresponding geared flange 140 integrally installed on the periphery of track mode steering shaft 124.

The track mode directional system includes, among other things, a potentiometer 142 that detects the angular position of track mode steering shaft 124 and sends track steering data to an electronic circuit which is at least capable of processing data, storing data and capable of data input and output. In the embodiment shown in the drawings, the electronic circuit is in the form of a microcontroller 144 located in control panel 56 and schematically shown in FIG. 11.

The wheel mode and track mode sleeves 128 and 136 of FIG. 10 both freely engage control shaft 118, i.e. can freely rotate about control shaft 118. Shaft coupler 126 further comprises a selective link in the form of a pin 146 capable of engaging either one of a first set of apertures formed coextensively within wheel mode sleeve 128 and control shaft 118 and a second set of apertures formed coextensively within track mode sleeve 136 and control shaft 118. Thus, pin 146 can selectively releasably link wheel mode sleeve 128 to control shaft 118 to have them rotate as one if it is in a first position shown in full lines in FIG. 10, or alternately it can selectively releasably link track mode sleeve 136 to control shaft 118 to have them rotate as one if it is in a second position shown in phantom lines in FIG. 10. Pin 146 is switched from its first set of apertures to its second set of apertures manually, although in an alternate embodiment it could be switched by means of automated means triggered from control panel 56.

FIG. 11 schematically shows that hybrid vehicle 20 comprises a wheel mode steering actuator in the form of first and second hydraulic cylinders 148, 150 which, as shown in FIGS. 1-7, link the chassis front and rear portions 30, 32 on either side of pivot 34. The wheel mode steering actuator further comprises a wheel mode steering hydraulic pump 152 (shown in FIGS. 7 and 11) connected to wheel mode steering shaft 122 and to a wheel mode steering valve 154 which will control hydraulic fluid flow within first and second cylinders 148, 150 to allow determined simultaneous opposite retraction and extraction of first and second cylinders 148, 150. More particularly, valve 154 is set to direct fluid flow to either simultaneously retract first cylinder 148 and extract second cylinder 150, or simultaneously extract first cylinder 148 and retract second cylinder 150.

In use, hybrid vehicle 20 may consequently be used in either one of its wheel and track modes.

When in its wheel mode, the vehicle body 22 and the wheel kit 24 of the hybrid vehicle kit will be used to form the wheel mode hybrid vehicle. As indicated hereinabove, rear actuator assembly 100 is removably installed on the chassis rear portion 32 and ground-engaging wheels 102 are installed on respective wheel drives of the front and rear actuator assemblies 74, 100. Front actuator assembly 74 is pivoted into its lowered position shown in phantom lines in FIG. 7. Furthermore, the wheel mode selector button 66 is activated in control panel 56 which will advise microcontroller 144 that the vehicle is selected to be in wheel mode. Pin 146 is installed to link wheel mode sleeve 128 and control shaft 118 thus enabling the wheel directional system, which concurrently allows track mode sleeve 136 to rotate freely about control shaft 118 thus disabling the track directional system. Driving hydraulic pumps 70, 72 are connected to a respective one of the front and rear actuator assemblies 74, 100. In other words, each pair of wheel drives that is carried by front and rear actuator assemblies 74, 100 is connected to a corresponding one of driving hydraulic pumps 70, 72. For example, the wheel drives of front actuator assembly can be connected to first hydraulic pump 70, while the wheel drives of rear actuator assembly 100 could be connected to second hydraulic pump 72.

To propel vehicle 20 forward in its wheel mode, wheels 102 are to be rotated by their corresponding wheel drives. To accomplish this, speed data will be calculated in microcontroller 144 from a speed signal acquired by a speed sensor (not shown) connected to accelerator pedal 60 which will be pressed by the vehicle driver to move vehicle 20. Microcontroller 144 will then calculate driving hydraulic pumps hydraulic rate data from the speed data and send a signal to hydraulic pumps 70, 72 that will administer a driving hydraulic rate representative of the hydraulic rate data to the wheel drives for propelling hybrid vehicle 20.

To steer vehicle 20 in its wheel node, the vehicle's enabled wheel mode directional system is used. More particularly, as shown in FIG. 10, the rotation of steering wheel 58 is transmitted to control shaft 118 and in turn to wheel mode steering shaft 122 through the instrumentality of shaft coupler 126 due to pin 146 linking wheel mode sleeve 128 to control shaft 118. As shown in FIG. 11, wheel mode steering hydraulic pump 152 will consequently feed valve 154 which will result in the combined retraction of first cylinder 148 and extraction of second cylinder 150 to steer hybrid vehicle 20 in a first direction, or in the combined extraction of first cylinder 148 and retraction of second cylinder 150 to steer hybrid vehicle 20 in a second direction opposite said first direction, depending on the direction of rotation of wheel mode steering shaft 122 (and, upstream thereof, of the direction of rotation of steering wheel 58). Consequently, hydraulic cylinders 148, 150 will force chassis front and rear portions 30, 32 to pivot relative to each other about pivot 34 thereby steering hybrid vehicle 20 in a corresponding direction. The more steering wheel 58 is turned in one direction, the more hydraulic cylinders 148, 150 will be extracted/retracted in opposite directions and the sharper the turning angle for vehicle 20.

When in its track mode, the vehicle body 22 and the track kit 26 of the hybrid vehicle kit will be used to form the track mode hybrid vehicle. If hybrid vehicle 20 was in its wheel mode beforehand, rear actuator assembly 100 is removed from the chassis rear portion 32 and ground-engaging wheels 102 are also removed from the wheel drives of the front and rear actuator assemblies 74, 100. Instead, track guide wheels 106 are installed on chassis 28 by means of track wheel framework 108 and track driving wheels 104 are installed on respective wheel drives of front actuator assembly 74. The latter is pivoted towards its raised position shown in full lines in FIG. 7, allowing the track driving wheel axles to be located slightly higher to provide a desirable upwardly inclined leading edge to tracks 110 which facilitates the track engagement over obstacles. Furthermore, the track mode selector button 68 is activated in control panel 56 which will advise microcontroller 144 that the vehicle is selected to be in track mode. Pin 146 is installed to integrally link track mode sleeve 136 and control shaft 118 thus enabling the track mode directional system, which concurrently allows wheel mode sleeve 136 to rotate freely about control shaft 118 thus disabling the wheel mode directional system. In the track mode, the wheel mode directional system is further disabled by positioning cylinders 148, 150 at a constant, intermediate, equally-extracted position which will maintain chassis front and rear portions 30, 32 in a parallel state. Driving hydraulic pumps 70, 72 are connected respectively to one of the wheel drives of the front actuator assembly 74. For example, wheel drive 78, 82 could be connected to first hydraulic pump 70, while wheel drive 80, 84 could be connected to second hydraulic pump 72.

In its track mode, vehicle 20 will be propelled and steered in a single operation. For this, tracks 110 are to be driven around their respective track guide and track driving wheels 104, 106. Tracks 110 will be guided by guide wheels 106 and driven by track driving wheels 104, and consequently it is the rotation of the latter which is to be obtained to control tracks 110. This is accomplished firstly by calculating speed data in microcontroller 144 from a speed signal acquired by the speed sensor (not shown) connected to accelerator pedal 60 which will be pressed by the vehicle driver to move vehicle 20; and secondly by rotating the steering wheel 58 of control panel 56 which will consequently rotate control shaft 118 which will transmit this rotational movement to track mode steering shaft 124 due to shaft coupler 126. Microcontroller 144 will consequently acquire track steering data from potentiometer 142 as a result of the steering wheel 58 being rotated. From the speed data and track steering data, microcontroller 144 will calculate driving hydraulic rate data for both tracks 110, and will transmit a corresponding signal to driving hydraulic pumps 70, 72 that will administer a driving hydraulic rate representative of the hydraulic rate data to the wheel drives for rotating the driving wheels 104 and consequently for propelling and steering hybrid vehicle 20.

This driving hydraulic rate data will be calculated to determine the required relative speed of each track 110 to obtain a combined vehicle speed and direction according to required speed and orientations inputted at the accelerator pedal 60 and steering wheel 58. Indeed, the dual track-propelled vehicle 20 can be steered by modifying the relative speed of the two tracks 110, and is propelled by driving tracks 110 around track wheels 104, 106. For example, if vehicle 20 is to move linearly forward, then both tracks 110 should be driven at a same speed. However, if vehicle 20 is to be steered in a first direction on the side of first track 110a, then the first track 110a should be driven slower than the second track 110b and vehicle 20 will consequently turn in a direction on the side of first track 110a; while if vehicle 20 is to be steered in a second direction opposite the first direction, then the second track 110b should be driven slower than the first track 110a and vehicle 20 will consequently turn in a direction on the side of second track 110b.

Generally, the forward displacement of vehicle 20 will be controlled by setting transmission stick 64 in a "forward" position, and the rearward displacement of vehicle 20 will be controlled by setting transmission stick 64 in a "reverse" position. Thus, using transmission stick 64 influences the rotational direction of rotation of the wheel drives of vehicle 20 as detailed hereinafter.

It is noted that although a rearwardly-moving vehicle will result in the wheels all rotating in the opposite direction than in the forward displacement in the vehicle's wheel mode, both the forward and the rearward movement of vehicle 20 in its track mode might result in the two wheel drives simultaneously rotating in opposite directions, for example if vehicle 20 moves slowly and a sharp turn is requested.

Accordingly, an adjustment to the driving hydraulic rate data is accomplished by microcontroller 144 when transmission stick 64 is set in its "reverse" position, to account for the difference in requested rotational directions of the vehicle wheel drives relative to the "forward" state. More particularly, transmission signal data will be received in microcontroller 144 from transmission stick 64. Microcontroller 144 will then determine a transmission state from the transmission signal data, namely "forward" or "reverse". If the transmission state corresponds to the "forward" state, then the default driving hydraulic rate data will be used for calculating the hydraulic rate of the driving hydraulic pumps. If the transmission state corresponds to the "reverse" state, then microcontroller 144 will encode the driving hydraulic rate data with a reverse state parameter. For example, microcontroller 144 could multiply all hydraulic rate data by −1 when the "reverse" state is detected. A negative hydraulic rate data value will be recognized by pumps 70, 72 to activate a reverse hydraulic flow direction, i.e. circulate the hydraulic fluid in the opposite direction relative to the forward direction.

The above explanations relate to calculating a hydraulic rate data based on speed data which is itself based on a speed signal received from the accelerator pedal. More particularly, the speed signal will relate to the position of the accelerator pedal, e.g. no additional speed is requested by the driver if he does not press on the pedal at all, whereas increasing the pressure on the pedal means that the driver requires the vehicle to move faster.

According to one embodiment, the hydraulic rate data will be calculated not only in relation to the speed data received, but also according to a motor running speed evaluated for example in RPMs (revolutions per minute). Microcontroller 144 is programmed to include values of maximum hydraulic rates for each corresponding motor running speed. For example, motor 50 might have a range of operative running speeds from 800 RPMs (idle speed) to 2200 RPMs (maximum running speed). Each running speed (rounded to a desired value of precision) will thus be assigned a corresponding maximum hydraulic rate for the hydraulic pumps, which may be expressed as a fraction of the maximum hydraulic rate value of the hydraulic pumps (i.e. a percentage). This will allow microcontroller 144 to determine the hydraulic rate data which will be representative of the hydraulic rate of pumps 70, 72. According to one embodiment, this fraction of the maximum hydraulic rate value is determined by assigning determined fraction of the maximum hydraulic rate values in a table for each motor running speed value. For example, motor running speeds between 800 and 2200 RPMs may be assigned fraction of the maximum hydraulic rate values that gradually increase from 25% to 100%.

In another embodiment, the fraction of the maximum hydraulic rate values are calculated based on equations that include the motor running speed value.

Hybrid vehicle 20 can be set to operate under either one of two operation modes, namely a displacement mode and a work mode. These two modes, which are distinct from the driving wheel and track modes and which operate independently therefrom, may be selected by means of a pair of an operation selector device in the form of operation selector buttons located on control panel 56, namely a displacement mode button 156 and a work mode button 158 (FIG. 11). Pressing these buttons will send an operation mode signal to microcontroller 144 to determine whether vehicle 20 is in its work mode or in its displacement mode.

In the displacement mode of vehicle 20, when the accelerator pedal 60 is pressed, the speed data obtained by microcontroller 144 will relate to the position of accelerator pedal 60. Microcontroller 144 determines a desired motor running speed value corresponding to this speed data, for example by determining it from a table of motor running speed values that correspond to displacement mode accelerator pedal positions. For example, if accelerator pedal is pressed halfway down, then the motor running speed could be halfway up its range of operative running speeds, e.g. 1500 RPMs if using the values given hereinabove. Then, a corresponding target fraction of the maximum hydraulic rate value is determined by microcontroller 144 according to this desired motor running speed value, for example from a table as indicated hereinabove.

Microcontroller 144 will then modify the motor running speed until the target desired running speed is reached. Also, microcontroller 144 will incrementally increase the hydraulic rate data until the target fraction of the maximum hydraulic rate value is obtained. Consequently, the hydraulic rate of pumps 70, 72 will increase incrementally until the target fraction of the maximum hydraulic rate value is reached. Thus, the vehicle speed will also increase until the target fraction of the maximum hydraulic rate value is reached, at which point the speed will remain constant.

This exercise is repeated if the accelerator pedal position is modified. Whenever the target fraction of the maximum hydraulic rate value is inferior to the actual hydraulic rate value, then microcontroller 144 sends a signal to hydraulic pumps 70, 72 to iteratively reduce the hydraulic rate until the target fraction of the maximum hydraulic rate value is reached.

In the work mode of vehicle 20, the motor running speed is set at a determined, fixed value. The motor will thereafter remain at this fixed value independently of any accelerator pedal position. For example, the fixed running speed value of motor 50 could be set at its maximum running speed of 2200 RPMs.

Microcontroller 144 will then, based on the position of accelerator pedal 60, obtain speed data to consequently determine a target fraction of the maximum hydraulic rate value. Contrarily to the displacement mode, this target fraction of the maximum hydraulic rate value will be determined directly from the accelerator pedal position, notwithstanding the motor running speed. For example, if the motor is set at any running speed such as the maximum running speed 2200 RPMS or another running such as 1200 RPMs, pressing the accelerator pedal 60 all the way down would result in the target fraction of the hydraulic rate being 100% of the capacity of hydraulic pumps 70, 72, while pressing the accelerator pedal 60 halfway down would result in the target fraction of the hydraulic rate being 50%.

Once the target fraction of the maximum hydraulic rate value is determined, microcontroller will control pumps 70, 72 to iteratively increase or decrease their hydraulic rate to reach the target fraction of the maximum hydraulic rate value.

It is noted that the work mode operation button may include an option to set the motor running speed at a selected one among different fixed running speeds.

The hybrid vehicle's work mode is especially useful when considering that hybrid vehicle 20 is equipped with a tool coupler 160 (FIGS. 1-7) at its front end which can be used to install thereon a power tool such as a high-capacity lawn mower, a snow blower or the like. In such a case, the power tool will be linked to the vehicle motor 50 for powering the tool, and it then becomes desirable in many cases to have a constant motor running speed to ensure constant operation parameters for the power tool. Furthermore, some power tools require a high power input, which would not be obtained if the motor running speed was permitted to vary according to the accelerator pedal position.

Otherwise, it will be understood that the dual work/displacement operation modes are facultative and hybrid vehicle 20 could work well in either mode on a permanent basis. For example, a hybrid vehicle 20 equipped with a standard non-powered tool such as a snow blade for snow removal, could well have a single operation mode equivalent to the so-called displacement mode.

It should be noted that the speed data will further be calculated from an additional speed signal received from the brake pedal 62. Indeed, microcontroller 144 will control the vehicle speed according to the brake pedal position. In one embodiment, microcontroller 144 would calculate its speed data taking into account both the accelerator pedal position and the brake pedal position. In one embodiment, pressing both the accelerator pedal 60 and the brake pedal 62 simultaneously would result in microcontroller applying a priority operation which would give priority to one pedal over the other, for example to the brake pedal. The hydraulic rate at pumps 70, 72 would consequently be decreased in such a circumstance. In one embodiment, pressing the brake pedal 62 will result in the hydraulic rate data being decreased proportionally to the position of the brake pedal. For example, if the brake pedal is pressed 25% of the way down, then the hydraulic rate data would be reduced by a factor of 25% and the driving pumps hydraulic rate would consequently also be reduced by a factor of 25%.

Disc brakes 94 are used as so-called park brakes and are controlled from a park brake controller (not shown) on control panel 56. The park brake controller is linked to microcontroller 144 to activate disc brakes 94 upon request. In one embodiment, microcontroller will activate disk brakes 94 only if the hydraulic rate at pumps 70, 72 is equal to zero.

In one embodiment, vehicle 20 is equipped with a hydraulic pump precision adjustment button 162 (FIG. 11) provided on control panel 56. Precision adjustment button 162 is used to help the vehicle driver in minute calibration of the relative hydraulic pump rate for pumps 70, 72.

As a result, if vehicle 20 is in its track driving mode, pressing on precision adjustment button 162 will send to microcontroller 144 a track speed adjustment command and the latter will relatively adjust the hydraulic rate data of first and second driving hydraulic pumps 70, 72 to redress minute hydraulic rate data errors destabilizing hybrid vehicle 20 from a linear driving trajectory. Indeed, in the track mode of vehicle 20, it is recalled that pumps 70, 72 feed respective wheel drives on either side of vehicle 20. This is particularly useful when vehicle 20 is set along a linear trajectory, for example when blowing snow away with a snow blower implement, and the driver wishes to accomplish very slight modifications of the vehicle's trajectory which might be difficult to accomplish with the more coarse driving wheel 58.

If, however, vehicle 20 is in its wheel mode, then pumps 70, 72 will feed pairs of wheel drives respectively on front and rear actuator assemblies 74, 100 as indicated hereinabove. Upon microcontroller 144 receiving a wheel speed adjustment command from precision adjustment button 162, it will consequently relatively adjust the hydraulic rate data of first and second driving hydraulic pumps 70, 72 by small predetermined iterative adjustment values to rectify unequal rear and front hybrid vehicle wheel set speeds. While this will not modify the vehicle's trajectory which is controlled by the lateral hydraulic cylinders 148, 150, it will help avoid a vehicle jerks, especially while braking.

Of course precision adjustment button 162 may be designed to allow a relative adjustment of the hydraulic rate data of first and second driving hydraulic pumps 70, 72 one way or another, i.e. either relatively increase or decrease the hydraulic rate data of pumps 70, 72.

It is understood that the expression "hybrid vehicle" as used herein means a vehicle which can adopt one of two different modes. These two modes are, as described throughout this specification, a wheel mode and a track mode, with the wheel mode and track modes being interchangeable on the vehicle. Although the two modes are not available simultaneously, they are both available on the vehicle, thus the expression "hybrid" is considered appropriate to characterize the vehicle of the present invention.

What is claimed is:

1. A method of electronically controlling the hydraulic liquid feed rate of first and second driving hydraulic pumps that feed respective wheel drives of a hybrid vehicle, said hybrid vehicle of the type comprising a vehicle body carrying said first and second driving hydraulic pumps and a motor carried by said vehicle body that powers said first and second driving hydraulic pumps, said hybrid vehicle defining a track mode in which said hybrid vehicle body is equipped with a track kit comprising a pair of ground-engaging tracks on opposite sides of said vehicle body that are independently driven by respective said wheel drives when said track kit is installed, and a wheel mode in which said vehicle body is equipped with a wheel kit instead of said track kit, said wheel kit comprising ground-engaging wheels on said opposite sides of said hybrid vehicle body that are driven by said wheel drives, said hybrid vehicle further of the type comprising an electronic circuit capable of processing data, storing data and capable of data input and output, said method comprising the steps of:

calculating in said electronic circuit speed data on the basis of a speed signal acquired by a speed sensor connected to a speed device;

receiving in said electronic circuit a driving mode signal from a mode selector device and determining whether said driving mode signal corresponds to said track mode or said wheel mode;

if said driving mode signal corresponds to said track mode:
acquiring, in said electronic circuit track steering data from a track steering sensor connected to a steering device;
calculating in said electronic circuit driving hydraulic rate data from said track steering data and said speed data; and
administering a driving hydraulic rate to each said driving servo-pump which is representative of said hydraulic rate data for propelling and steering said hybrid vehicle;

if said driving mode signal corresponds to said wheel mode
calculating said driving hydraulic pumps hydraulic rate data from said speed data;
administering a driving hydraulic rate which is representative of said hydraulic rate data to said driving hydraulic pumps for propelling said hybrid vehicle; and
steering said hybrid vehicle with a wheel mode directional system.

2. The method according to claim 1 wherein said wheel mode directional system comprises a wheel mode directional hydraulic pump hydraulically connected to a wheel mode steering actuator for selectively controlling the direction of said hybrid vehicle, said method further comprising the steps of:

if said driving mode signal corresponds to said track mode disabling said wheel mode steering actuator; and
if said driving mode signal corresponds to said wheel mode enabling said wheel mode steering actuator to allow said steering device to control said wheel mode directional hydraulic pump for controlling the direction of said hybrid vehicle.

3. The method as defined in claim 2, wherein said wheel mode directional system further comprises a pivot pivotally linking chassis front and rear portions each supported by respective said ground-engaging wheels, said wheel mode steering actuator being connected to said chassis front and rear portions, the step of steering said hybrid vehicle with said wheel mode steering system comprising: controlling said wheel steering actuator with said wheel mode directional hydraulic pump to force said chassis front and rear portions to pivot relative to each other thereby steering said hybrid vehicle when it is in said wheel mode.

4. A hybrid vehicle kit as defined in claim 3, wherein said wheel mode steering actuator comprises first and second hydraulic cylinders linking said chassis front and rear portions on either side of said pivot, the step of controlling said wheel steering actuator with said wheel mode directional hydraulic pump comprising: effecting either one of a combined retraction of said first cylinder and extraction of said second cylinder to steer said hybrid vehicle in a first direction, and a combined extraction of said first cylinder and retraction of said second cylinder to steer said hybrid vehicle in a second direction.

5. The method according to claim 1, further comprising the following steps
calculating said speed data further on the basis of a motor running speed data which is representative of the motor running speed, in addition to calculating said speed data on the basis of said speed signal;
receiving in said electronic circuit an operation signal from an operation selector device determining whether said hybrid vehicle is in a displacement mode or in a work mode;
if said hybrid vehicle is in said work mode, fixing said motor running speed at a determined value.

6. The method according to claim 1, further comprising the steps of:
receiving in said electronic circuit a transmission signal data;
determining a transmission state from said transmission signal data;
if said transmission state corresponds to a reverse state, encoding said driving hydraulic rate data with a reverse state parameter.

7. The method according to claim 1 wherein said wheel kit includes front and rear drive wheel sets that are driven by respective wheel drives, said method further comprising the following step if said driving mode signal corresponds to said track mode: receiving in said electronic circuit a track speed adjustment command and relatively adjusting said hydraulic rate data of said first and second driving hydraulic pumps to redress minute hydraulic rate data errors destabilizing said hybrid vehicle from a linear driving trajectory.

8. The method according to claim 7, further comprising the following step if said driving mode signal corresponds to said wheel mode: receiving in said electronic circuit a wheel speed adjustment command and relatively adjusting said hydraulic rate data of said first and second driving hydraulic pumps by small predetermined iterative adjustment values to rectify unequal rear and front hybrid vehicle wheel set speeds.

9. The method according to claim 1, wherein said speed data includes first data from an accelerator device and second data from a brake device, with said first data providing a target speed hydraulic rate data value which will be used to calculate said hydraulic rate data according to a desired speed of said hybrid vehicle, and with said second data reducing said target speed data by a braking factor which is representative of a braking intensity of said brake device.

10. A hybrid vehicle kit comprising a vehicle body capable of being interchangeably coupled to either one of a wheel kit thus forming a hybrid vehicle in a wheel mode, said wheel kit comprising a number of ground-engaging wheels; and a track kit, thus forming said hybrid vehicle in a track mode, said track kit comprising a pair of ground-engaging tracks carried by track wheels, said vehicle body comprising a chassis carrying a motor;
two driving hydraulic pumps carried by said chassis and powered by said motor;
a number of wheel drives powered by a corresponding one of said driving hydraulic pumps;
an electronic circuit capable of processing data, storing data and capable of data input and output, said electronic circuit operatively connected to said driving hydraulic pumps for controlling the hydraulic liquid feed rate of said driving hydraulic pumps;
a mode selector device capable of receiving a command and to emit a corresponding driving mode signal to said electronic circuit, said driving mode signal identifying said hybrid vehicle to be in either one of said track mode and said wheel mode;
a speed device capable of transmitting a speed signal to said electronic circuit that will in turn calculate speed data on the basis of said speed signal;
a steering device capable of transmitting a track steering signal to said electronic circuit that will in turn calculate track steering data on the basis of said track steering signal; and
a wheel mode directional system allowing said hybrid vehicle to be steered when it is in said wheel mode;

wherein in said wheel mode said ground-engaging wheels are operatively mounted to corresponding said wheel drives, said electronic circuit calculating hydraulic rate data on the basis of said speed data to control said first and second driving hydraulic pumps so that they will administer a hydraulic rate to said wheel drives which is representative of said hydraulic rate data to control the rotational speed of said ground-engaging wheels which will propel said hybrid vehicle; and wherein in said track mode at least some of said track wheels are operatively mounted to corresponding said wheel drives, said electronic circuit calculating hydraulic rate data on the basis of said speed data and of said track steering data to control said first and second driving hydraulic pumps so that they will administer a respective hydraulic rate to said wheel drives which is representative of said hydraulic rate data to control the rotational speed of said at least some of said track wheels that are operatively mounted to corresponding said wheel drives, to both propel and steer said hybrid vehicle.

11. A hybrid vehicle kit as defined in claim 9, wherein said electronic circuit comprises a microcontroller.

12. A hybrid vehicle kit as defined in claim 9, wherein in said track mode said vehicle body comprises a removable track wheel framework carrying at least a portion of said track wheels.

13. A hybrid vehicle as defined in claim 9, wherein said wheel mode directional system comprises a wheel mode directional hydraulic pump hydraulically connected to a wheel mode steering actuator for selectively controlling the direction of said hybrid vehicle, whereby if said hybrid vehicle is in said track mode said wheel mode steering actuator is disabled, and if said hybrid vehicle is in said wheel mode said wheel mode steering actuator is enabled to allow said steering device to control said wheel mode directional hydraulic pump for controlling the direction of said hybrid vehicle.

14. A hybrid vehicle as defined in claim 12, wherein said wheel mode directional system further comprises a pivot pivotally linking chassis front and rear portions each supported by respective said ground-engaging wheels, said wheel mode steering actuator being connected to said chassis front and rear portions, whereby said wheel steering actuator is controlled with said wheel mode directional hydraulic pump to force said chassis front and rear portions to pivot relative to each other thereby steering said hybrid vehicle when it is in said wheel mode.

15. A hybrid vehicle as defined in claim 13, wherein said wheel mode steering actuator comprises first and second hydraulic cylinders linking said chassis front and rear portions on either side of said pivot, whereby either one of a combined retraction of said first cylinder and extraction of said second cylinder to steer said hybrid vehicle in a first direction, and a combined extraction of said first cylinder and retraction of said second cylinder to steer said hybrid vehicle in a second direction, is effected.

* * * * *